(12) United States Patent
Gniewek et al.

(10) Patent No.: US 8,648,259 B2
(45) Date of Patent: Feb. 11, 2014

(54) ACCORDION-STYLE GROMMET WITH SHAPE-INFLUENCING STIFFENERS

(75) Inventors: Michael J. Gniewek, Canton, MI (US); Takeshi Takahashi, Novi, MI (US); Seiji Ito, Isehara (JP)

(73) Assignee: Yazaki North America, Inc., Canton, MI (US)

( * ) Notice: Subject to any disclaimer, the term of this patent is extended or adjusted under 35 U.S.C. 154(b) by 125 days.

(21) Appl. No.: 13/348,840

(22) Filed: Jan. 12, 2012

(65) Prior Publication Data
US 2013/0180759 A1    Jul. 18, 2013

(51) Int. Cl.
*H01B 17/58*    (2006.01)

(52) U.S. Cl.
USPC ............. 174/152 G; 174/153 G; 174/650; 16/2.1; 248/56; 439/604

(58) Field of Classification Search
USPC ............. 174/152 G, 153 G, 650; 16/2.1, 2.2; 248/56; 439/604
See application file for complete search history.

(56) References Cited

U.S. PATENT DOCUMENTS

| | | |
|---|---|---|
| 3,082,470 A | 3/1963 | Fork |
| 3,794,080 A | 2/1974 | Huston et al. |
| 4,793,384 A | 12/1988 | Lalikos et al. |
| 4,865,362 A | 9/1989 | Holden |
| 4,907,836 A | 3/1990 | Ueda et al. |
| 5,448,017 A | 9/1995 | Nakajima et al. |
| 5,716,044 A | 2/1998 | Peterson et al. |
| 5,911,450 A | 6/1999 | Shibata et al. |
| 5,958,315 A | 9/1999 | Fatato et al. |
| 6,015,952 A | 1/2000 | Mori et al. |
| 6,278,060 B1 | 8/2001 | Mori et al. |
| 6,534,713 B2 | 3/2003 | Kafer et al. |
| 6,844,497 B2 | 1/2005 | Frantz et al. |
| 6,901,627 B2 | 6/2005 | Uchida et al. |
| 6,933,439 B2 | 8/2005 | Nishihara et al. |
| 7,020,931 B1 | 4/2006 | Burnett et al. |
| 7,026,549 B1 * | 4/2006 | Smutny et al. ............ 248/56 |
| 7,053,304 B2 | 5/2006 | Ojima et al. |
| 7,053,305 B2 | 5/2006 | Takase et al. |
| 7,053,311 B2 | 5/2006 | Santanda et al. |
| 7,098,402 B2 | 8/2006 | Suzuki et al. |
| 7,244,894 B1 | 7/2007 | Lipp |
| 7,297,874 B2 | 11/2007 | Yasuda et al. |
| 7,423,223 B2 | 9/2008 | Taira |
| 7,659,480 B2 | 2/2010 | Bikhleyzer |
| 7,834,272 B2 | 11/2010 | Bikhleyzer |
| 7,943,854 B1 | 5/2011 | Lipp |
| 8,420,943 B1 * | 4/2013 | La et al. ............ 174/152 G |

* cited by examiner

*Primary Examiner* — Dhirubhai R Patel
(74) *Attorney, Agent, or Firm* — Harness, Dickey & Pierce, P.L.C.

(57) ABSTRACT

A grommet for housing electrical wires constructed in accordance with the teachings of the present disclosure includes a mounting structure, a tube, and a plurality of stiffeners. The mounting structure is configured to mount to a panel of a vehicle, the mounting structure defining a first passage extending therethrough. The tube extends from the mounting structure and defines a second passage in communication with the first passage. The tube includes a corrugated portion having a plurality of ridges and a plurality of grooves interposed between the plurality of ridges. The stiffeners are interposed between those of the plurality of ridges that are disposed within a zone of the corrugated portion. The stiffeners extend partially around a circumference of the tube.

12 Claims, 5 Drawing Sheets

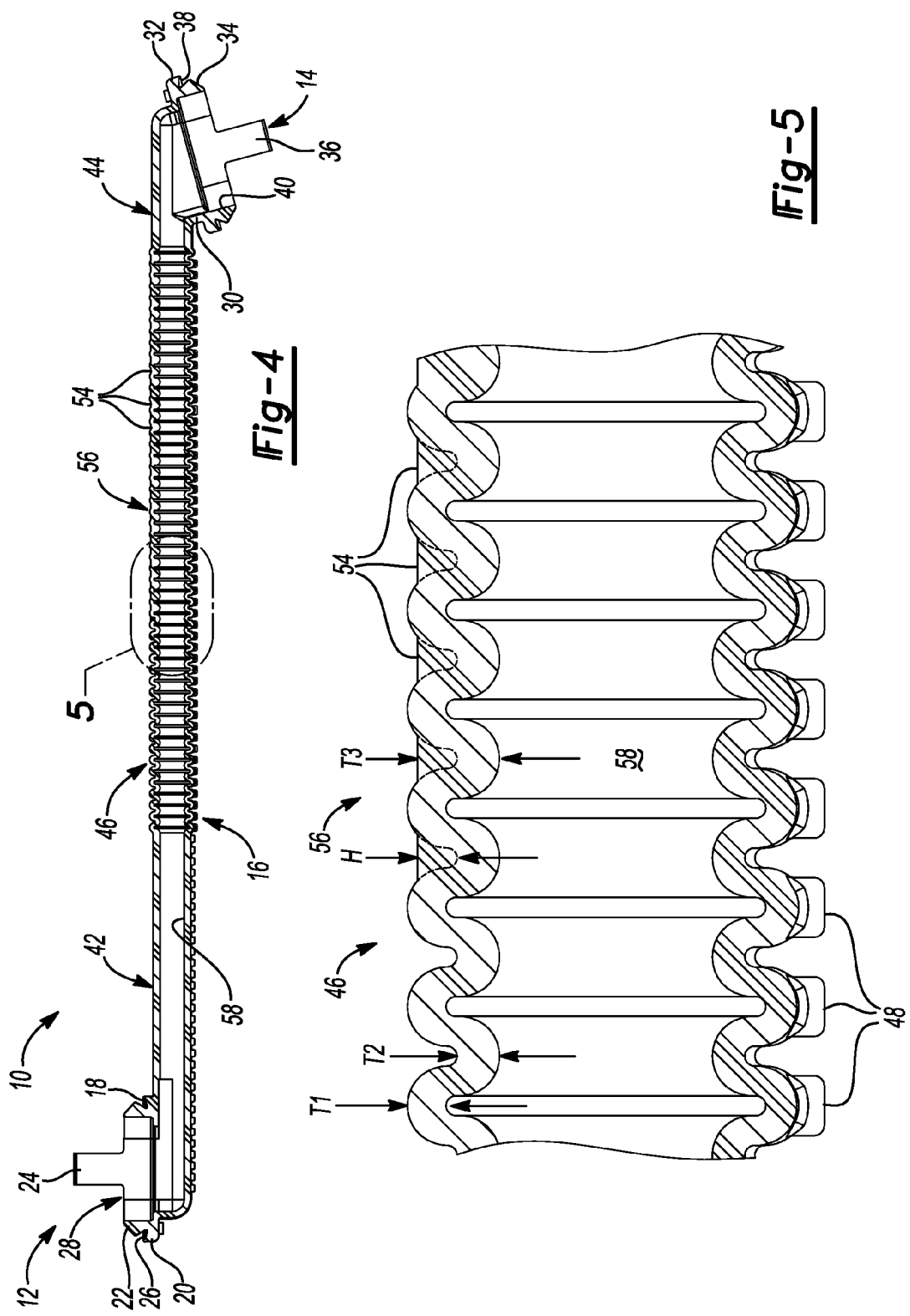

ACCORDION-STYLE GROMMET WITH SHAPE-INFLUENCING STIFFENERS

FIELD

The present disclosure relates to accordion-style grommets, and more particularly, to accordion-style grommets with shape-influencing stiffeners.

BACKGROUND

This section provides background information related to the present disclosure which is not necessarily prior art.

Grommets are often used to house and protect electrical wires in areas where the wires may be exposed to, for example, moving components that may damage the wires. Accordion-style grommets include a corrugated portion having alternating ridges and grooves. The corrugated portion enables the grommets to bend as needed to route wires housed in the grommet from one location to another location without causing damage to the grommet or the wires.

An accordion-style grommet may be installed in a vehicle to house electrical wires extending from an instrument panel to a panel of a door. In this case, wires may influence the shape of the grommet as the door is closed. The potential for the wires to influence the shape of the grommet may be greater when the grommet is long and/or when the wires are twisted. Changes in the shape of the grommet may direct the grommet to a pinch zone between the door and an adjacent body panel, which may ultimately cause damage to the wires. Thus, the ability to influence the shape of an accordion-style grommet may be desired in certain areas of a vehicle and in other products that use the grommet.

SUMMARY

This section provides a general summary of the disclosure, and is not a comprehensive disclosure of its full scope or all of its features.

A grommet for housing electrical wires constructed in accordance with the teachings of the present disclosure includes a mounting structure, a tube, and a plurality of stiffeners. The mounting structure is configured to mount to a panel of a vehicle, the mounting structure defining a first passage extending therethrough. The tube extends from the mounting structure and defines a second passage in communication with the first passage. The tube includes a corrugated portion having a plurality of ridges and a plurality of grooves interposed between the plurality of ridges. The stiffeners are interposed between those of the plurality of ridges that are disposed within a zone of the corrugated portion. In one form, the stiffeners extend partially around a circumference of the tube.

In another form, the plurality of stiffeners include a first stiffener and a second stiffener. The first stiffener extends around the circumference of the tube by a first amount. The second stiffener extends around the circumference of the tube by a second amount that is different from the first amount.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4 is a section view of the grommet of FIG. 1 taken along a line 4-4 shown in FIG. 2;

FIG. 5 is an enlarged section view of a portion of the grommet of FIG. 1 within an oval 5 shown in FIG. 4;

Corresponding reference numerals indicate corresponding parts throughout the several views of the drawings.

DETAILED DESCRIPTION

Example embodiments will now be described more fully with reference to the accompanying drawings.

Figure 1:
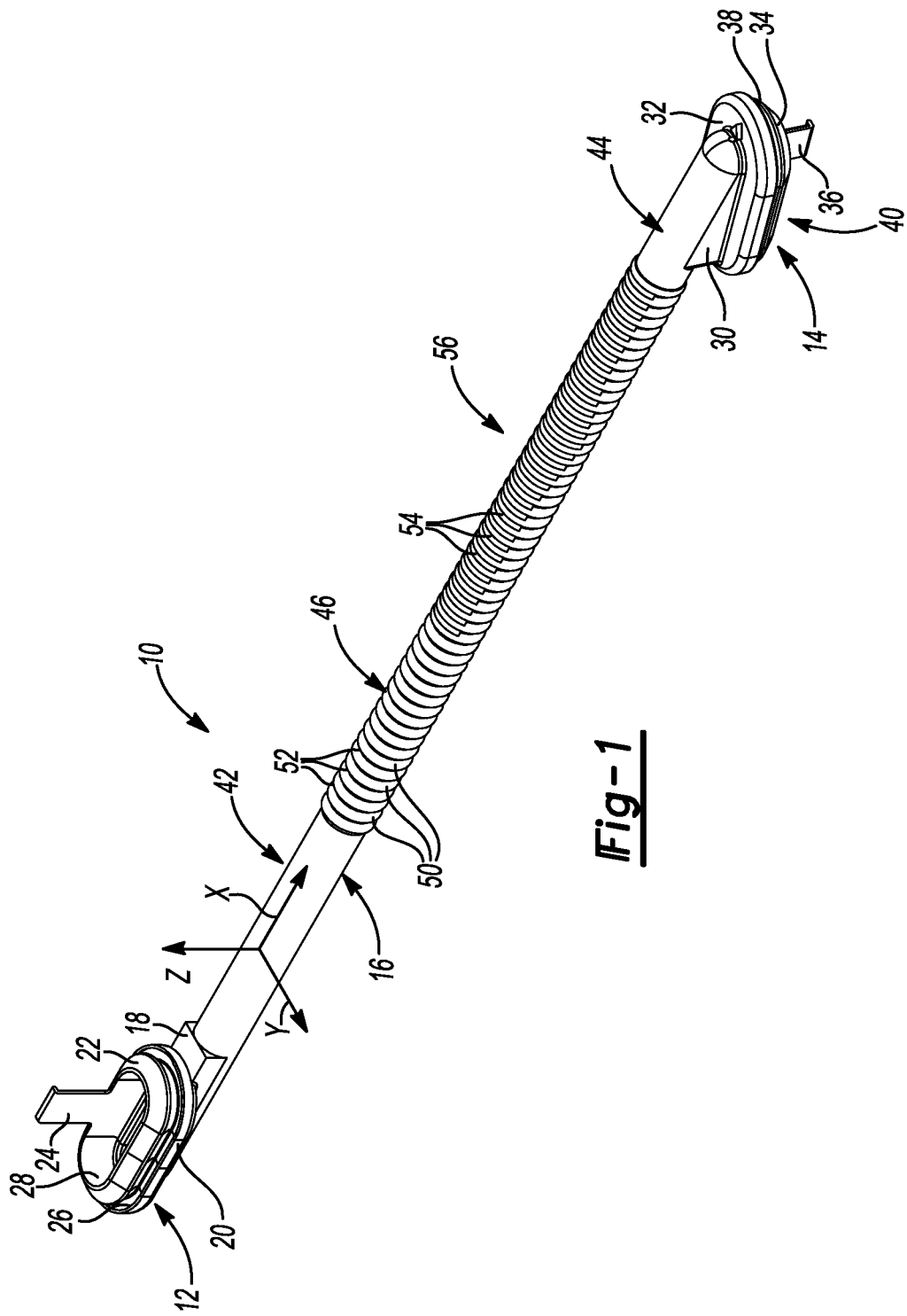
FIG. 1 is a perspective view of an accordion-style grommet with shape-influencing stiffeners according to the principles of the present disclosure.
Figure 2:
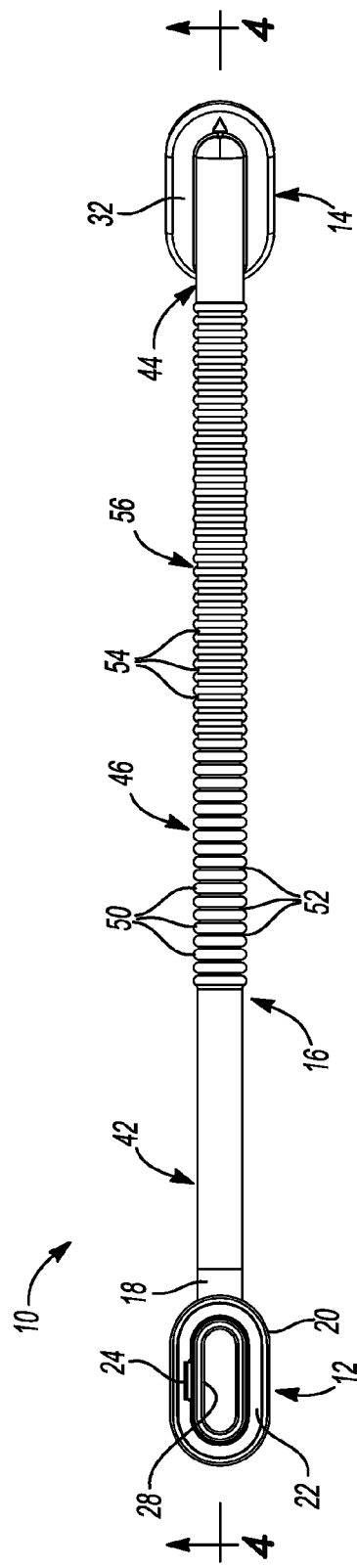
FIG. 2 is a top view of the grommet of FIG. 1.
Figure 3:
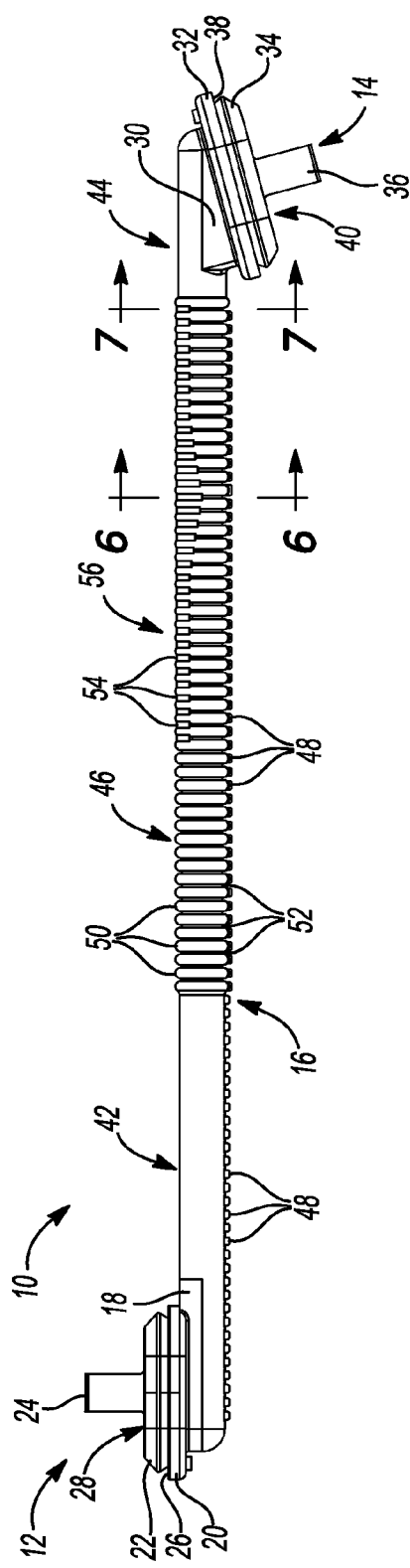
FIG. 3 is a side view of the grommet of FIG. 1.

With reference to FIGS. 1 through 3, an accordion-style grommet constructed in accordance with the teachings of the present disclosure is generally indicated by reference numeral 10. The grommet 10 can have a longitudinal axis x, a lateral axis y, and a vertical axis z. The grommet 10 can be configured to house electrical wires and can include a first mounting structure 12, a second mounting structure 14, and a tube 16 connected to and extending between the first mounting structure 12 and the second mounting structure 14. The first mounting structure 12, the second mounting structure 14, and the tube 16 can be unitarily formed from the same material. For example, the first mounting structure 12, the second mounting structure 14, and the tube 16 can be formed from a rubber, such as an ethylene propylene diene monomer (EPDM) rubber, using injection molding.

The first mounting structure 12 and the second mounting structure 14 can be configured to mount within apertures defined in, for example, various body panels of a vehicle. The first mounting structure 12 can include a rectangular plinth 18, a first elliptic cylinder 20, a second elliptic cylinder 22, and a tab 24. The rectangular plinth 18 can extend from the tube 16 along the vertical axis z. The first elliptic cylinder 20 can extend from the rectangular plinth 18 along the vertical axis z. The second elliptic cylinder 22 can extend from the first elliptic cylinder 20 along the vertical axis z. The first elliptic cylinder 20 and the second elliptic cylinder 22 can define a groove 26 extending therebetween. The tab 24 can extend from the second elliptic cylinder 22 along the vertical axis z. The first mounting structure 12 can define a passage 28 extending therethrough.

The second mounting structure 14 can include a rectangular plinth 30, a first elliptic cylinder 32, a second elliptic cylinder 34, and a tab 36. The rectangular plinth 30 can extend from the tube 16 generally along the vertical axis z. The first elliptic cylinder 32 can extend from the rectangular plinth 30 in a first direction perpendicular to the end of the rectangular plinth 30 from which the first elliptic cylinder 32 extends. The second elliptic cylinder 34 can extend from the first elliptic cylinder 32 in the first direction. The first elliptic cylinder 32 and the second elliptic cylinder 34 can define a groove 38 extending therebetween. The tab 36 can extend from the second elliptic cylinder 34 in the first direction. The first mounting structure 12 can define a passage 40 extending therethrough.

The tube 16 can include a first smooth portion 42, a second smooth portion 44, and a corrugated portion 46. The first mounting structure 12 of the grommet 10 can extend from the first smooth portion 42, and the second mounting structure 14 of the grommet 10 can extend from the second smooth portion 44. As best shown in FIG. 3, the first smooth portion 42 and the corrugated portion 46 can include nubs 48 extending therefrom. The nubs 48 can be used when the grommet 10 is installed to ensure that the grommet 10 is not twisted.

The corrugated portion 46 can have a variable wall thickness and can include ridges 50 and grooves 52 interposed between the ridges 50. The corrugated portion 46 can also include stiffeners 54 interposed between the ridges 50. The quantity and placement of the stiffeners 54 can be selected to yield a desired shape of the grommet 10. For example, the quantity of the stiffeners 54 can be increased to increase the bending stiffness of the grommet 10. In addition, the stiffeners 54 can be placed in a zone 56 of the corrugated portion 46 to increase the bending stiffness of the grommet 10 in the zone 56.

The stiffeners 54 can be unitarily formed with the remainder of the corrugated portion 46. Alternatively, the stiffeners 54 can be formed separate from and attached to the remainder of the corrugated portion 46. Additionally, the stiffeners 54 and the remainder of the corrugated portion 46 can be formed from the same material or different materials. For example, the stiffeners 54 can be formed from a material that is stiffer than the material from which the remainder of the corrugated portion 46 is formed.

If the material selected for the stiffeners 54 is the same as the material selected for the remainder of the grommet 10, the stiffeners 54 and the remainder of the grommet 10 can be formed by a single injection molding process. If the material selected for the stiffeners 54 is different from the material selected for the remainder of the grommet 10, the stiffeners 54 can be formed by a secondary operation or process.

Referring to FIGS. 4 and 5 the tube 16 can be hollow and can define a passage 58 extending between and connecting the passage 28 in the first mounting structure 12 and the passage 40 in the second mounting structure 14. The stiffeners 54 have a height H extending radially from the tube 16. The height H of the stiffeners 54 can be selected to yield a desired shape of the grommet 10. For example, the height H of the stiffeners 54 can be increased to increase the bending stiffness of the grommet 10. The height H of the stiffeners 54 can be uniform or non-uniform along the longitudinal axis x of the grommet 10

The height H of the stiffeners 54 can increase the wall thickness of the corrugated portion 46 in the locations at which the stiffeners 54 are placed. In this regard, the corrugated portion 46 has a first wall thickness T1 at the ridges 50, a second wall thickness T2 at those of the grooves 52 in which the stiffeners 54 are not disposed, and a third wall thickness T3 at those of the grooves 52 in which the stiffeners 54 are disposed. The first wall thickness T1 and the second wall thickness T2 can be equal, and the third wall thickness T3 can be greater than the first and second wall thicknesses T2, T3. The difference between the third wall thickness T3 and the first and second wall thicknesses T2, T3 can be equal to the height H of the stiffeners 54.

Figure 6:
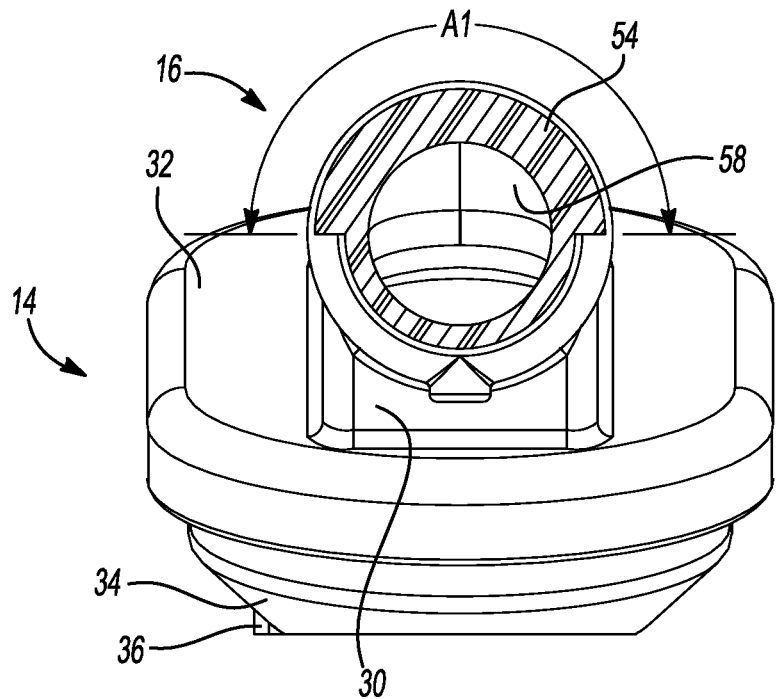
FIG. 6 is a section view of the grommet of FIG. 1 taken along a line 6-6 shown in FIG. 3.
Figure 7:
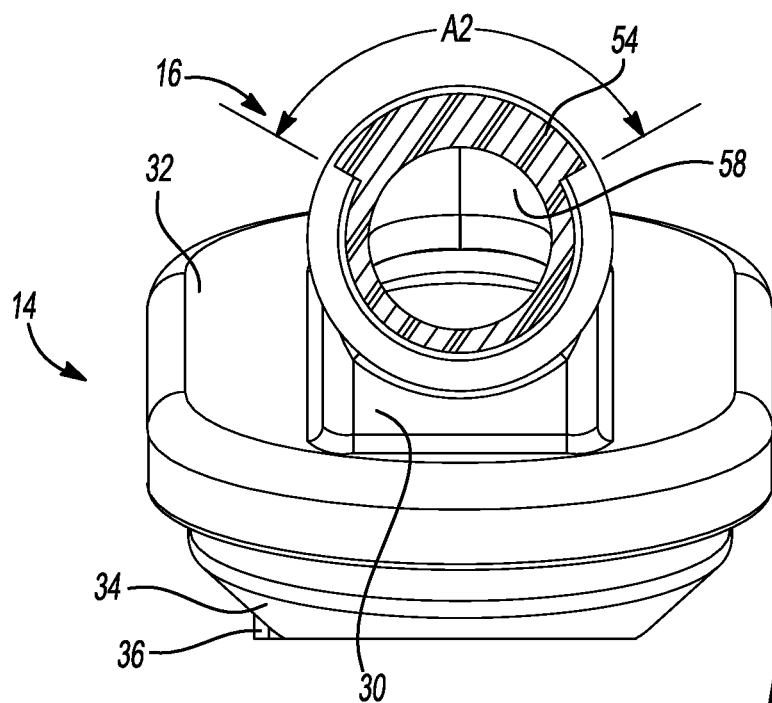
FIG. 7 is a section view of the grommet of FIG. 1 taken along a line 7-7 shown in FIG. 3.

Referring to FIGS. 6 and 7, the stiffeners 54 can extend at least partially around the circumference of the tube 16 through an angle relative to the center of the tube. The angle of the stiffeners 54 can be selected to yield a desired shape of the grommet 10. For example, the angle can be increased to increase the bending stiffness of the grommet 10. The angle of the stiffeners 54 can be uniform or non-uniform along the longitudinal axis x of the grommet 10. For example, the one of the stiffeners 54 can extend through a first angle A1 (e.g., 180 degrees) and another one of the stiffeners 54 can extend through a second angle A2 (e.g., 120 degrees) that is different from the first angle A1. The stiffeners 54 can extend around the circumference of the tube 16 in a continuous and uniform manner or a discontinuous and non-uniform manner. For example, the height of the stiffeners 54 can vary around the circumference of the tube 16 from greater than zero, to zero, to greater than zero, causing a discontinuity. Although the ends of the stiffeners 54 are shown as including sharp corners at the top of the stiffeners 54 and at the base of the stiffeners 54, one can appreciate that these corners may be rounded for strength and ease of forming.

Referring again to FIGS. 1 through 3, operation of the grommet 10 will now be described. As discussed above, the first mounting structure 12 and the second mounting structure 14 can be configured to mount within apertures defined in various body panels of a vehicle. For example, the first mounting structure 12 can be configured to mount to a door panel and the second mounting structure 14 can be configured to mount to an instrument panel. In this regard, the grommet 10 can be configured to house electrical wires extending between the instrument panel and the door panel.

When the grommet 10 is installed in a vehicle, electrical wires can be inserted through one of the passages 28, 40, through the passage 58, and through the other one of the passages 28, 40. After the wires are inserted through the passages 28, 40, and 58, the grommet 10 can be secured to the wires, for example, by taping the tabs 24, 36 to the wires. The first mounting structure 12 of the grommet 10 can then be inserted into a first panel of the vehicle until the first panel is seated within the groove 26 between the first elliptic cylinder 20 and the second elliptic cylinder 22. Similarly, the second mounting structure 14 of the grommet 10 can be inserted into a second panel of the vehicle until the second panel is seated within the groove 38 between the first elliptic cylinder 32 and the second elliptic cylinder 34.

Figure 8:
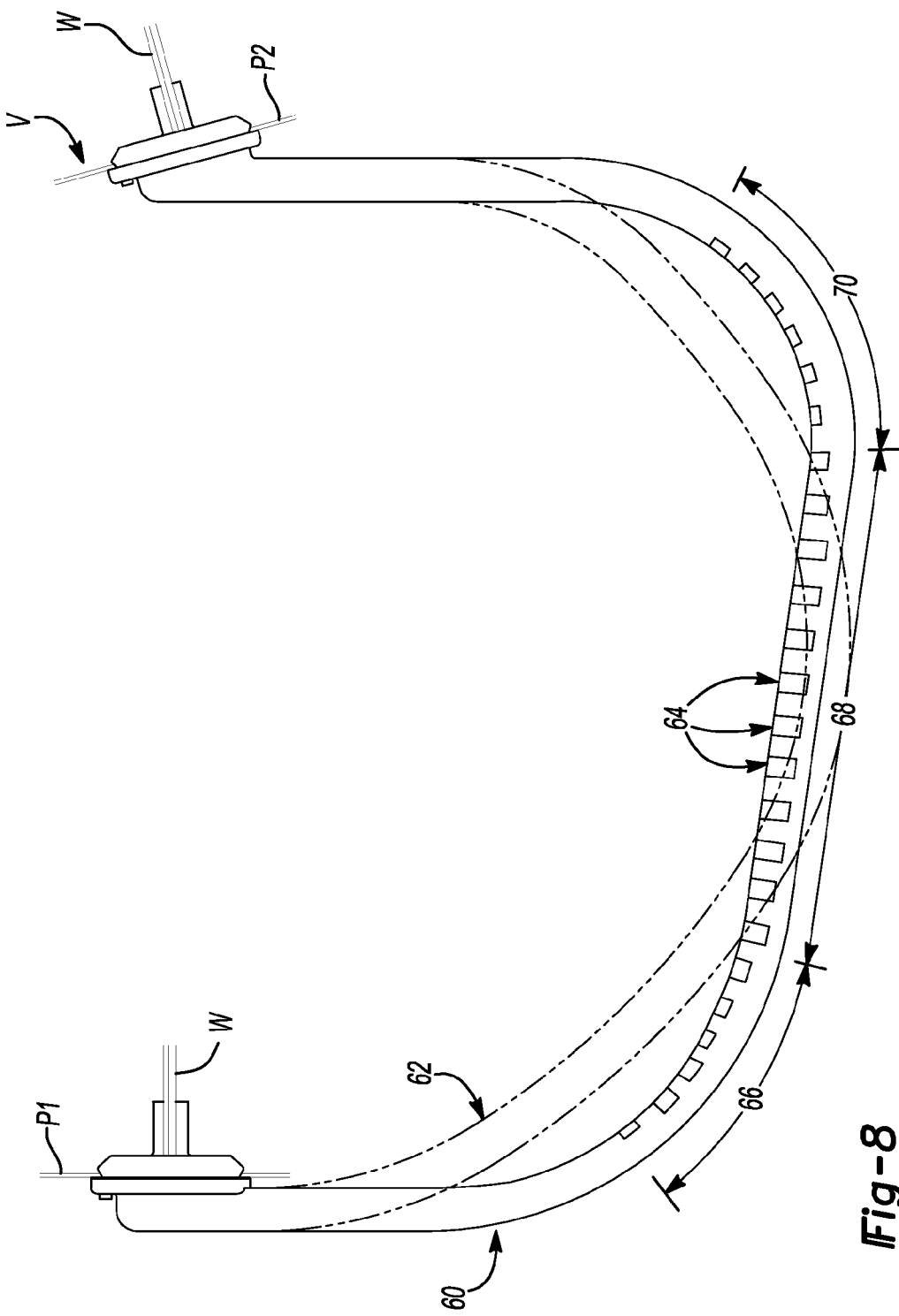
FIG. 8 is a side view of an accordion-style grommet with shape-influencing stiffeners according to the principles of the present disclosure shown in solid lines and an accordion-style grommet without shape-influencing stiffeners shown in phantom lines.

Referring to FIG. 8, an accordion-style grommet 60 according to the present disclosure is shown in solid, and an accordion-style grommet 62 according to the prior art is shown in phantom. The grommets 60, 62 are shown installed in a vehicle V with the ends of the grommets 60, 62 fixed to a first panel P1 and a second panel P2, and wires W extending through the grommets 60, 62. The grommet 60 includes stiffeners 64 disposed in first, second, and third lengths 66, 68, 70 of the grommet 60. The grommet 62 does not include stiffeners.

Although the ends of the grommets 60, 62 are identically positioned, the shapes of the grommets 60, 62 are different. The bend radius of the grommet 62 is generally uniform, while the bend radius of the grommet 60 non-uniform along the length of the grommet 60. This non-uniformity is caused by the stiffeners 64. The stiffeners 64 are disposed on the side of the grommet 60 that is under compression when the grommet 60 is installed. Thus, when the grommet 60 is installed, the stiffeners 64 oppose the bending forces transmitted through the grommet 60. As a result, the stiffeners 64 influence the bend radius of the grommet in the first, second, and third lengths 66, 68, 70.

The non-uniformity in the bend radius of the grommet 10 along the length of the grommet 10 can be attributed to the different angles of the stiffeners 64 (i.e., the different amounts by which the stiffeners 64 extend around the circumference of the grommet 60). The angles of the stiffeners 64 in the first and third lengths 66, 70 are less than the angles of the stiffeners 64 in the second length 68. As a result, most of the bending takes place in the first and third lengths 66, 70, while little to no bending takes place in the second length 68.

Thus, the angles of the stiffeners 64 can be different in different lengths of the grommet 10 to limit deflection of the grommet 10 by different amounts in the different lengths. Additionally or alternatively, other aspects of the stiffeners 64 can be different in the different lengths to limit deflection of the grommet 10 by different amounts in the different lengths. The other aspects can include the height of the stiffeners 64, the quantity of the stiffeners 64, the placement of the stiffeners 64, and/or the material of the stiffeners 64.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A grommet for housing electrical wires, the grommet comprising:
    a mounting structure configured to mount to a panel of a vehicle, the mounting structure including a first passage extending therethrough; and
    a tube coupled to and extending from the mounting structure, the tube defining a second passage that is in communication with the first passage, the tube including a corrugated portion having a plurality of ridges, a plurality of grooves, which are interposed between the plurality of ridges, and a plurality of stiffeners, the stiffeners being disposed in a zone of the corrugated portion such that each stiffener is disposed between and connects a pair of adjacent ridges, each of the stiffeners having a height that extends radially outward from the groove, the plurality of stiffeners including a first stiffener and a second stiffener, the first stiffener extending around a circumference of the tube by a first amount, the second stiffener extending around the circumference of the tube by a second amount that is different from the first amount.

2. The grommet of claim 1, wherein the plurality of stiffeners extend partially around the circumference of the tube.

3. The grommet of claim 1, wherein the zone of the corrugated portion extends partially along a length of the corrugated portion.

4. The grommet of claim 1, wherein the plurality of stiffeners extend around the circumference of the tube in a continuous manner.

5. The grommet of claim 1, wherein the height of the plurality of stiffeners is uniform around the circumference of the tube.

6. The grommet of claim 1, wherein the plurality of stiffeners are unitarily formed with the tube.

7. The grommet of claim 1, wherein the tube has a first wall thickness at the plurality of ridges, the tube has a second wall thickness at the plurality of stiffeners, and the second wall thickness is greater than the first wall thickness by an amount that is equal to the height of the plurality of stiffeners.

8. A grommet for housing electrical wires, the grommet comprising:
    a mounting structure configured to mount to a panel of a vehicle, the mounting structure including a first passage extending therethrough; and
    a tube coupled to and extending from the mounting structure, the tube defining a second passage that is in communication with the first passage of the mounting structure, the tube including a corrugated portion having a plurality of ridges, a plurality of grooves, which are interposed between the plurality of ridges, and a plurality of stiffeners, the stiffeners being disposed in a zone of the corrugated portion such that each stiffener is disposed between and connects a pair of adjacent ridges, each of the stiffeners cooperating to limit deflection of the zone of the corrugated portion when opposite ends of the tube are positioned in a predetermined installment orientation.

9. The grommet of claim 8, wherein, when the ends of the tube are positioned in the installment orientation, a first length of the grommet has a first bend radius and a second length of the grommet has a second bend radius that is different from the first bend radius.

10. The grommet of claim 9, wherein a first quantity of the plurality of stiffeners are disposed in the first length and a second quantity of the plurality of stiffeners are disposed in the second length, the second quantity being different from the first quantity.

11. The grommet of claim 9, wherein those of the plurality of stiffeners disposed in the first length extend around a circumference of the tube by a first amount and those of the plurality of stiffeners disposed in the second length extend around the circumference of the tube by a second amount that is different from the first amount.

12. The grommet of claim 9, wherein those of the plurality of stiffeners disposed in the first length are formed from a first material and those of the plurality of stiffeners disposed in the second length are formed from a second material that is different from the first material.

\* \* \* \* \*